United States Patent
Oshiba et al.

(10) Patent No.: US 10,115,953 B2
(45) Date of Patent: Oct. 30, 2018

(54) ENERGY STORAGE APPARATUS

(71) Applicant: GS Yuasa International Ltd., Kyoto-shi (JP)

(72) Inventors: Masashi Oshiba, Kyoto (JP); Hiroyasu Koyama, Kyoto (JP); Yuta Mizukawa, Kyoto (JP); Kazuya Fujisawa, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 839 days.

(21) Appl. No.: 14/296,306

(22) Filed: Jun. 4, 2014

(65) Prior Publication Data
US 2014/0370341 A1 Dec. 18, 2014

(30) Foreign Application Priority Data
Jun. 14, 2013 (JP) .................................. 2013-125890

(51) Int. Cl.
*H01M 2/20* (2006.01)
*H01M 2/10* (2006.01)
*H01M 2/30* (2006.01)

(52) U.S. Cl.
CPC .......... *H01M 2/202* (2013.01); *H01M 2/1077* (2013.01); *H01M 2/206* (2013.01); *H01M 2/305* (2013.01)

(58) Field of Classification Search
CPC .... H01M 2/202; H01M 2/1077; H01M 2/206; H01M 2/305
USPC ......................................................... 429/82
See application file for complete search history.

(56) References Cited

U.S. PATENT DOCUMENTS

| | | | |
|---|---|---|---|
| 5,141,826 A | 8/1992 | Böhm et al. | |
| 8,563,165 B2 | 10/2013 | Takayama et al. | |
| 9,397,327 B2 | 7/2016 | Takase et al. | |
| 2006/0246350 A1 | 11/2006 | Takayama et al. | |
| 2010/0248008 A1* | 9/2010 | Sugawara | H01M 2/1077 429/159 |
| 2011/0064986 A1 | 3/2011 | Ogasawara et al. | |
| 2012/0015550 A1 | 1/2012 | Ikeda et al. | |
| 2012/0322320 A1 | 12/2012 | Takase et al. | |

(Continued)

FOREIGN PATENT DOCUMENTS

| | | |
|---|---|---|
| JP | 2002-343331 A | 11/2002 |
| JP | 2003-346940 A | 12/2003 |

(Continued)

OTHER PUBLICATIONS http://www.12volt.com.au/redirect.html?a=/General%20Htmls/webcat2003/breakers.html accessed on Sep. 25, 2016.*

(Continued)

*Primary Examiner* — Jonathan G Jelsma
*Assistant Examiner* — Rashid A Alam
(74) *Attorney, Agent, or Firm* — McGinn IP Law Group, PLLC

(57) ABSTRACT

An energy storage apparatus includes: one or more energy storage devices; a wiring connection component for connecting first wiring and second wiring, the first wiring being connected to at least one of the one or more energy storage devices, the second wiring being external wiring; and an attachment portion to which the wiring connection component is detachably attached.

16 Claims, 14 Drawing Sheets

(56) References Cited

U.S. PATENT DOCUMENTS

| | | | | |
|---|---|---|---|---|
| 2012/0323511 A1* | 12/2012 | Saigo | ............. | H01M 2/206 702/63 |
| 2013/0171495 A1* | 7/2013 | Ogasawara | ......... | H01M 2/1077 429/121 |
| 2013/0288530 A1* | 10/2013 | Zhao | ............. | H01M 2/206 439/627 |
| 2014/0342212 A1* | 11/2014 | Goesmann | ............ | H01M 2/206 429/121 |
| 2015/0291045 A1* | 10/2015 | Sugawara | ........... | H01M 2/1077 318/139 |

FOREIGN PATENT DOCUMENTS

| | | | |
|---|---|---|---|
| JP | 2006-313733 A | 11/2006 | |
| JP | 2009-289428 A | 12/2009 | |
| JP | 2010-015931 A | 1/2010 | |
| JP | 2010-050040 A | 3/2010 | |
| JP | 2010-160930 A | 7/2010 | |
| JP | 2011-181402 A | 9/2011 | |
| JP | 2012-128983 A | 7/2012 | |
| JP | WO 2012108514 A1 * | 8/2012 | ......... H01M 2/1077 |
| JP | 2012-256495 A | 12/2012 | |
| JP | 2013-062102 A | 4/2013 | |
| JP | 2013-077455 A | 4/2013 | |
| JP | 2013114956 A * | 6/2013 | |
| JP | 2013-140709 A | 7/2013 | |
| JP | 2013-229266 A | 11/2013 | |
| JP | WO 2013186878 A1 * | 12/2013 | ......... H01M 2/1077 |
| WO | WO 2009/140277 A1 | 11/2009 | |
| WO | WO 2010/135456 A2 | 11/2010 | |
| WO | WO 2013/010912 A2 | 1/2013 | |

OTHER PUBLICATIONS

English translation of JP 2013114956 A, Okamoto, Jun. 2013, Japan.*

English translation of WO 2013010912 A2, Rechenberg, Jan. 24, 2013, Japan.*

Extended European Search Report dated Nov. 17, 2014.

* cited by examiner

ENERGY STORAGE APPARATUS

CROSS REFERENCE TO RELATED APPLICATIONS

The present application is based on and claims priority of Japanese Patent Application No. 2013-125890 filed on Jun. 14, 2013. The entire disclosure of the above-identified application, including the specification, drawings, and claims is incorporated herein by reference in its entirety.

FIELD

The present invention relates to an energy storage apparatus including one or more energy storage devices housed in a module case.

BACKGROUND

Battery packs (energy storage packs) that include a plurality of battery modules (energy storage apparatuses) housed in a pack case are well known. The plurality of battery modules each include one or more battery cells (energy storage devices) housed in a module case (for example, see Japanese Unexamined Patent Application Publication No. 2012-128983). In this sort of battery pack, in order to monitor, for example, the voltage of the battery cells, a cable for obtaining the voltage information is wired from an electrode terminal of the battery cell to outside the pack case of the battery pack.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide an energy storage apparatus having increased design flexibility.

An energy storage apparatus according to one aspect of the present invention includes: one or more energy storage devices; a wiring connection component for connecting first wiring and second wiring, the first wiring being connected to at least one of the one or more energy storage devices, the second wiring being external wiring; and an attachment portion to which the wiring connection component is detachably attached.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Figure 1:
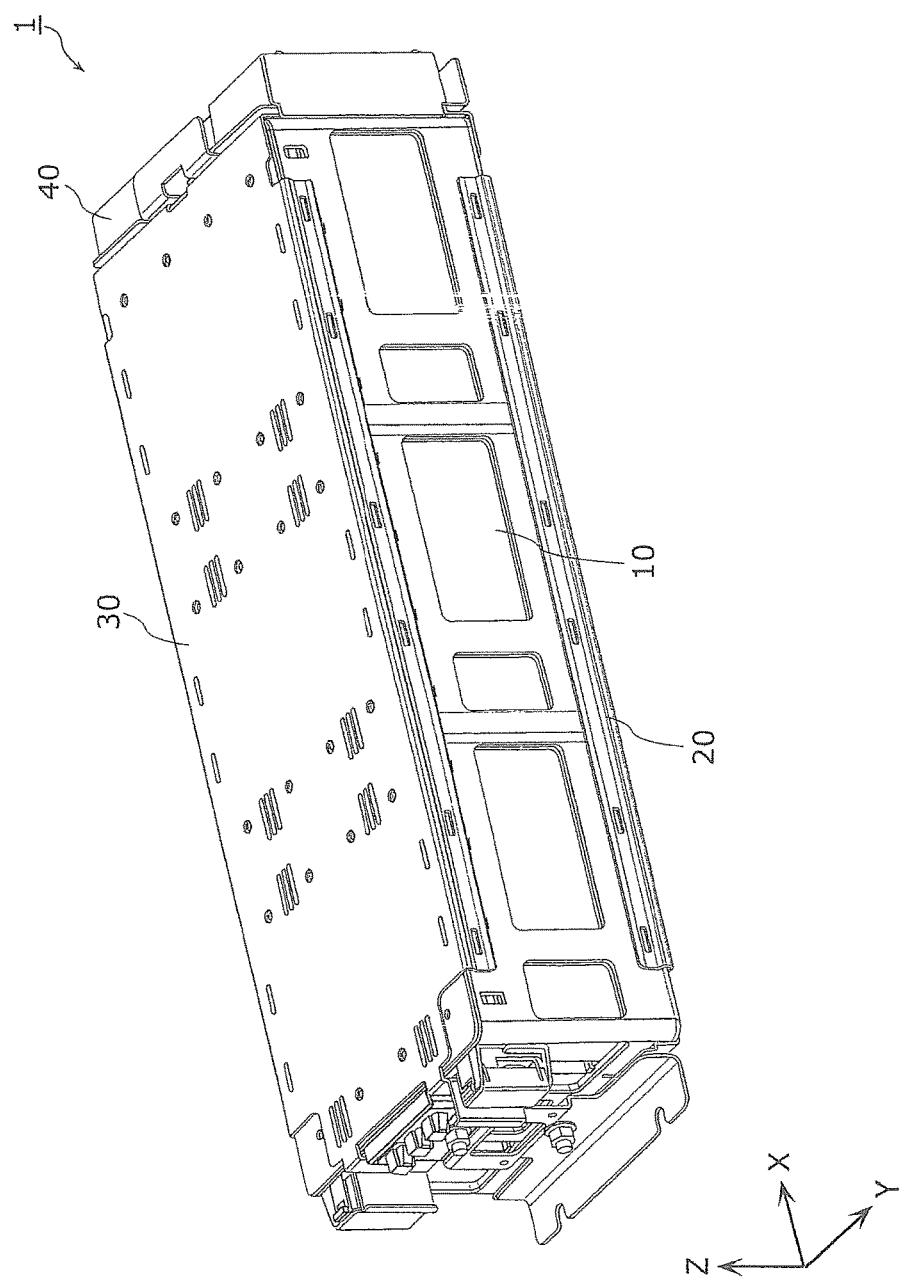
FIG. 1 is an external perspective view of an energy storage apparatus according to an embodiment of the present invention.

The design flexibility of the conventional battery modules is limited by the wiring for monitoring, for example, the voltage of the battery cells.

In other words, in the conventional battery pack, since it is necessary for the battery modules housed in the pack case to have a configuration designed for the wiring, the configuration thereof is constrained, limiting the design flexibility of the battery modules.

The present invention was conceived in view of the above and aspects of the present invention provide an energy storage apparatus having increased design flexibility.

An energy storage apparatus according to one aspect of the present invention includes: one or more energy storage devices; a wiring connection component for connecting first wiring and second wiring, the first wiring being connected to at least one of the one or more energy storage devices, the second wiring being external wiring; and an attachment portion to which the wiring connection component is detachably attached.

With this, the energy storage apparatus is configured such that the wiring connection component, which is for connecting together (i) the first wiring connected to the energy storage device and (ii) the external second wiring, is detachably attachable to the attachment portion. For this reason, even if the configuration of the energy storage apparatus is changed, it is possible to connect wiring designed for the configuration of the energy storage apparatus by changing out the wiring connection component. Moreover, when there is no need to connect wiring to the energy storage apparatus, it is possible to simplify the configuration of the energy storage apparatus by, for example, removing the wiring connection component, or attaching a wiring connection component to which unnecessary connectors are not attached. In this way, providing the detachably attachable wiring connection component increases the design flexibility of the energy storage apparatus.

Moreover, the energy storage apparatus may be disposed in an energy storage pack in which a different energy storage apparatus is also disposed, and the wiring connection component may connect the first wiring, which is connected to the wiring connection component, and the second wiring, which is connected to the wiring connection component and to the different energy storage apparatus.

With this configuration, the wiring connection component makes it possible to connect together two energy storage apparatuses in the energy storage pack. In other words, even if the two energy storage apparatuses have different configurations, it is possible to connect the two energy storage apparatuses together by attaching wiring connection components that match the configurations of the energy storage apparatuses, thereby increasing the design flexibility of the energy storage apparatuses.

Moreover, the wiring connection component may include: a connector to which the first wiring is connected; a connector holder for holding the connector; and a main body to which the connector holder is detachably attached.

With this, the wiring connection component is configured such that the connector holder for holding the connector is detachably attachable to the main body. Consequently, even if the configuration of the energy storage apparatus is changed, it is possible to connect wiring designed for the configuration of the energy storage apparatus by changing out the connector holder. Moreover, when there is no need to connect wiring to the energy storage apparatus, it is possible to simplify the configuration of the energy storage apparatus by, for example, removing the connector holder, or attaching a connector holder to which unnecessary connectors are not attached. In this way, providing the detachably attachable connector holder increases the design flexibility of the energy storage apparatus.

Moreover, the main body may include a curved guide portion that guides the first wiring.

With this configuration, since the main body of the wiring connection component includes the curved guide portion that guides the first wiring, the first wiring can be easily connected to the wiring connection component without bending and such.

Moreover, each of the one or more energy storage devices may include a positive terminal and a negative terminal, and the wiring connection component may be located on a side of the energy storage apparatus, the side being an end of the energy storage apparatus in a direction in which the positive terminal and the negative terminal are aligned.

With this configuration, the wiring connection component is located on a side of the energy storage apparatus, which is an end of the energy storage apparatus, in the direction in which the positive terminal and the negative terminal of the energy storage device are aligned. Here, when the substrate including the first wiring is disposed in the space between the positive terminal and the negative terminal of the energy storage device, the substrate is not disposed at the end of the energy storage apparatus in the above-described direction of alignment. Consequently, in a configuration in which the connector is provided on the substrate, the positive terminal and the negative terminal are obstructive, making it difficult to connect the second wiring from the side (end) of the energy storage apparatus in the above-described direction of alignment. However, by disposing the wiring connection component on the side of the energy storage apparatus in the above-described direction of alignment, the positive terminal and the negative terminal of the energy storage devices are not obstructive even when the substrate is disposed in the space between the positive terminal and the negative terminal, and the second wiring can be easily connected from the side of the energy storage apparatus in the above-described direction of alignment. As such, even when the second wiring is arranged on the side of the energy storage apparatus in the above-described direction of alignment, the second wiring can be easily connected from the side of the energy storage apparatus in the above-described direction of alignment by connecting the second wiring to the connector of the wiring connection component.

Moreover, the wiring connection component may be located on a short side of the energy storage apparatus.

With this configuration, since the wiring connection component is located on the short side of the energy storage apparatus, when, for example, the energy storage apparatus is inserted into a stacked housing including the second wiring arranged on the above-described short side, the second wiring can be easily connected to the wiring connection component.

Moreover, the energy storage apparatus may further include: a plurality of openings for attaching the wiring connection component; and a blocking component that blocks, among the plurality of openings, an opening at which the wiring connection component is not attached.

With this configuration, since the energy storage apparatus includes the blocking component that blocks, among the plurality of openings for attachment of the wiring connection component, an opening at which the wiring connection component is not attached, it possible to keep foreign matter from entering the energy storage apparatus through the opening. In particular, when the energy storage apparatus is cooled by drawing air therein using, for example, a fan, there is concern that foreign matter could be drawn in with the air, but it is possible to keep foreign matter from entering with the provision of the blocking component.

Moreover, the energy storage apparatus may include a plurality of module units each including the one or more energy storage devices. The wiring connection component may include an external wiring connection component detachably attached to the attachment portion of an outermost one of the plurality of module units.

With this configuration, since the energy storage apparatus includes a plurality of module units, and the wiring connection component includes an external wiring connection component detachably attached to the attachment portion of an outermost one of the plurality of module units, it is possible to easily connect the second wiring to the energy storage apparatus with the external wiring connection component. Moreover, it is possible to easily configure the energy storage apparatus by lining up the plurality module units having simple structures.

Moreover, the energy storage apparatus may further include: a substrate disposed in, among the plurality of module units, the module unit to which the external wiring connection component is attached.

With this configuration, in the energy storage apparatus, since the substrate is disposed in the module unit provided with the external wiring connection component, it is possible to shorten the cable connecting the connector and the substrate by disposing the substrate close to the connector.

Moreover, the energy storage apparatus may further include a cooling apparatus that introduces a coolant into the plurality of module units. The substrate may be disposed in, among the plurality of module units, the module unit located upstream of flow of the coolant.

With this configuration, since the substrate is disposed in the module unit located upstream of the flow of the coolant introduced by the cooling apparatus, it is possible to limit an increase in temperature of the substrate from the heat generated by the energy storage device since the coolant introduced comes into contact with the substrate.

Moreover, the energy storage apparatus may include a plurality of module units each including the one or more energy storage devices. The wiring connection component may include a wiring duct bridging two of the plurality of module units so as to form a path for wiring passing between the two of the plurality of module units.

With this configuration, since the energy storage apparatus includes the plurality of module units and the wiring connection component includes the wiring duct which forms a path for wiring passing between two of the module units, wiring between two module units can be performed easily.

Moreover, each of the plurality of module units may include the two attachment portions to each of which the wiring duct is detachably attachable, and the wiring duct may be detachably attached to and bridge two adjacent ones of the attachment portions included in the two adjacent module units.

With this configuration, since each of the plurality of module units includes the two attachment portions to each of which the wiring duct is detachably attachable, it is possible to change out the wiring duct when necessary.

Hereinafter, the energy storage apparatus according to an exemplary embodiment of the present invention is described in greater detail with reference to the accompanying drawings. It should be noted that the embodiment described below shows a preferred, specific example of the present invention. The numerical values, shapes, materials, structural elements, the arrangement and connection of the structural elements etc. shown in the following embodiment are mere examples, and therefore do not limit the present invention. Moreover, among the structural elements in the following embodiment, structural elements not recited in any one of the independent claims defining the most generic part of the inventive concept are described as arbitrary structural elements.

Embodiment

First, the configuration of an energy storage apparatus 1 will be described.

Figure 2:
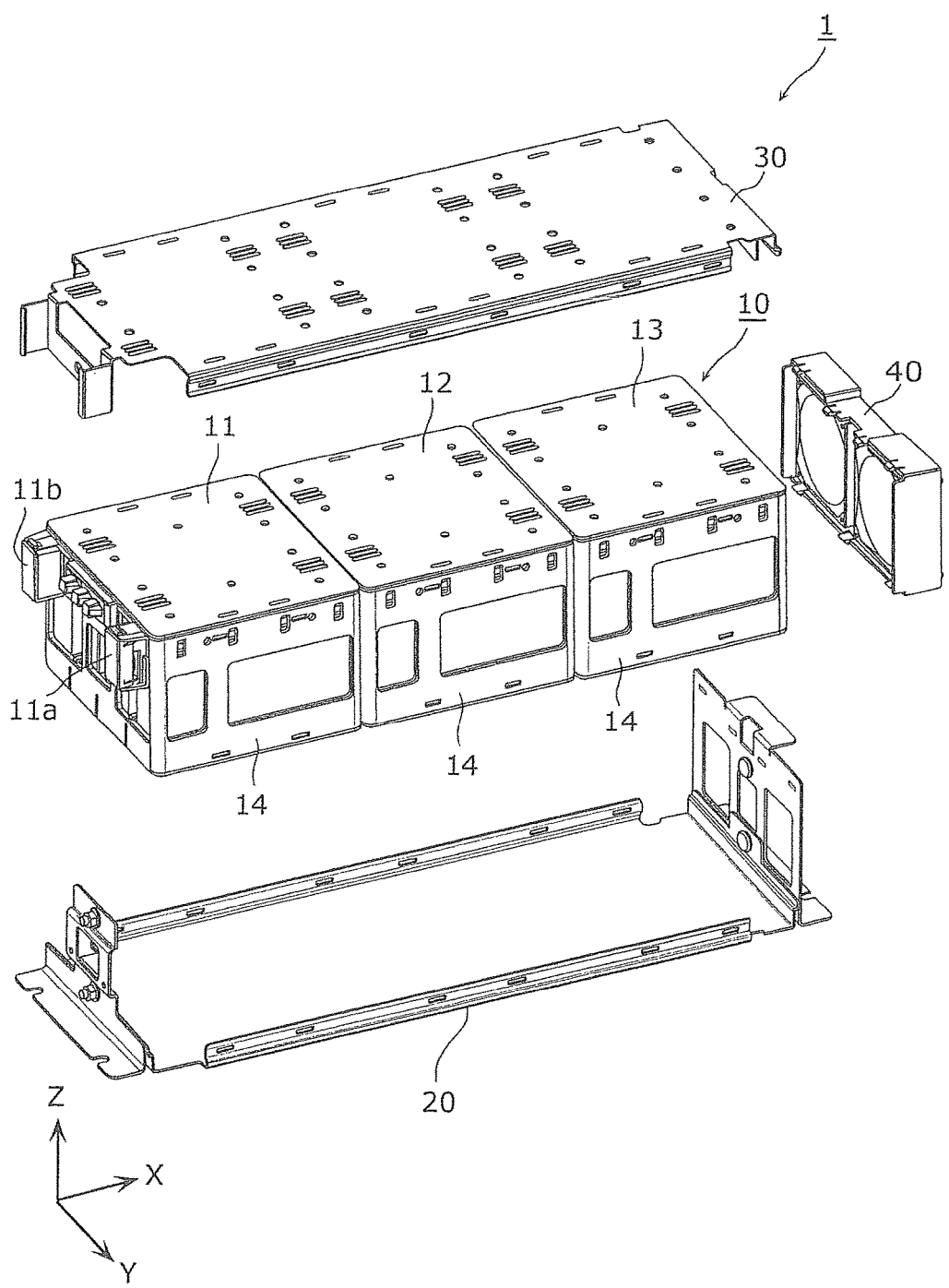
FIG. 2 is an exploded perspective view illustrating structural components of the energy storage apparatus.

FIG. 1 is an external perspective view of the energy storage apparatus 1 according to the embodiment of the present invention. FIG. 2 is an exploded perspective view illustrating structural components of the energy storage apparatus 1.

It should be noted that the Z axis is shown as being the vertical direction in FIG. 1 and FIG. 2. The Z axis is exemplified as being the vertical direction in the following description as well, but depending on the mode of use, it is conceivable that the Z axis may be a direction other than the vertical direction. As such, the Z axis is not limited to the vertical direction. The same applies to other drawings as well.

The energy storage apparatus 1 is an energy storage module capable of charging electricity from an external source and discharging electricity to an external device. The energy storage apparatus 1 is, for example, a high-voltage battery module used to store energy and/or used as a power source.

As is illustrated in FIG. 1 and FIG. 2, the energy storage apparatus 1 includes a module group 10 including module units 11, 12, and 13, a lower coupling component 20, an upper coupling component 30, and a cooling apparatus 40. It should be noted that the energy storage apparatus 1 may include only one module unit.

The module units 11, 12, and 13 included in the module group 10 are aligned along the X axis. The module unit 11 includes an external positive terminal cover 11a which covers the external positive terminal (to be described later) and an external negative terminal cover 11b which covers the external negative terminal (to be described later). The energy storage apparatus 1 charges electricity from an external source and discharges electricity to an external device through the external positive terminal under the external positive terminal cover 11a and the external negative terminal under the external negative terminal cover 11b.

The module units 11, 12, and 13 are rectangular modules including one or more energy storage devices housed in a module case 14. Each of the module units 11, 12, and 13 has the same configuration. Moreover, the positive terminals and negative terminals of adjacent ones of the module units 11, 12, and 13 are electrically connected, whereby all energy storage devices in the module units 11, 12, and 13 are connected in series. It should be noted that the configuration of the module group 10 will be described in detail later.

The lower coupling component 20 and the upper coupling component 30 are components which couple the module units 11, 12, and 13 together. The lower coupling component 20 couples the module units 11, 12, and 13 from below and the upper coupling component 30 couples the module units 11, 12, and 13 from above. In other words, fixing the lower coupling component 20 and the upper coupling component 30 together with the module units 11, 12, and 13 disposed therebetween couples the module units 11, 12, and 13 together.

More specifically, the lower coupling component 20 and the upper coupling component 30 are flat components formed, for example, from a conductive material such as metal. With this, the module units 11, 12, and 13 are firmly and securely fixed.

Moreover, each module case 14 of the module units 11, 12, and 13 is mounted on the lower coupling component 20.

The cooling apparatus 40 is a fan located on a side of the module group 10 in the positive direction of the X axis that introduces a coolant into the module group 10. In other words, the cooling apparatus 40 is located in a position opposed to the end of the module unit 13 in the direction of alignment of the module units 11, 12, and 13. The cooling apparatus 40 draws in outside air (the coolant) from the end of the module group 10 in the negative direction of the X axis, and introduces air into each module case 14 of the module units 11, 12, and 13. The cooling apparatus 40 then expels the air from the end of the module group 10 in the positive direction of the X axis out the back of the cooling apparatus 40.

It should be noted that the cooling apparatus 40 may draw in outside air from the end of the module group 10 in the positive direction of the X axis and expel the air from the end of the module group 10 in the negative direction of the X axis. Moreover, the coolant introduced into the module group 10 by the cooling apparatus 40 is not limited to atmospheric air. For example, the coolant may be cold air chilled by a condenser. Furthermore, in the embodiment, the cooling apparatus 40 is provided with two fans, but number of fans the cooling apparatus 40 has is not limited to this example. Still further, the cooling apparatus 40 is not limited to the use of a fan. As long as it introduces the coolant into the module group 10, something other than a fan may be used.

Next, the configuration of the module group 10 will be described in detail.

Figure 3:
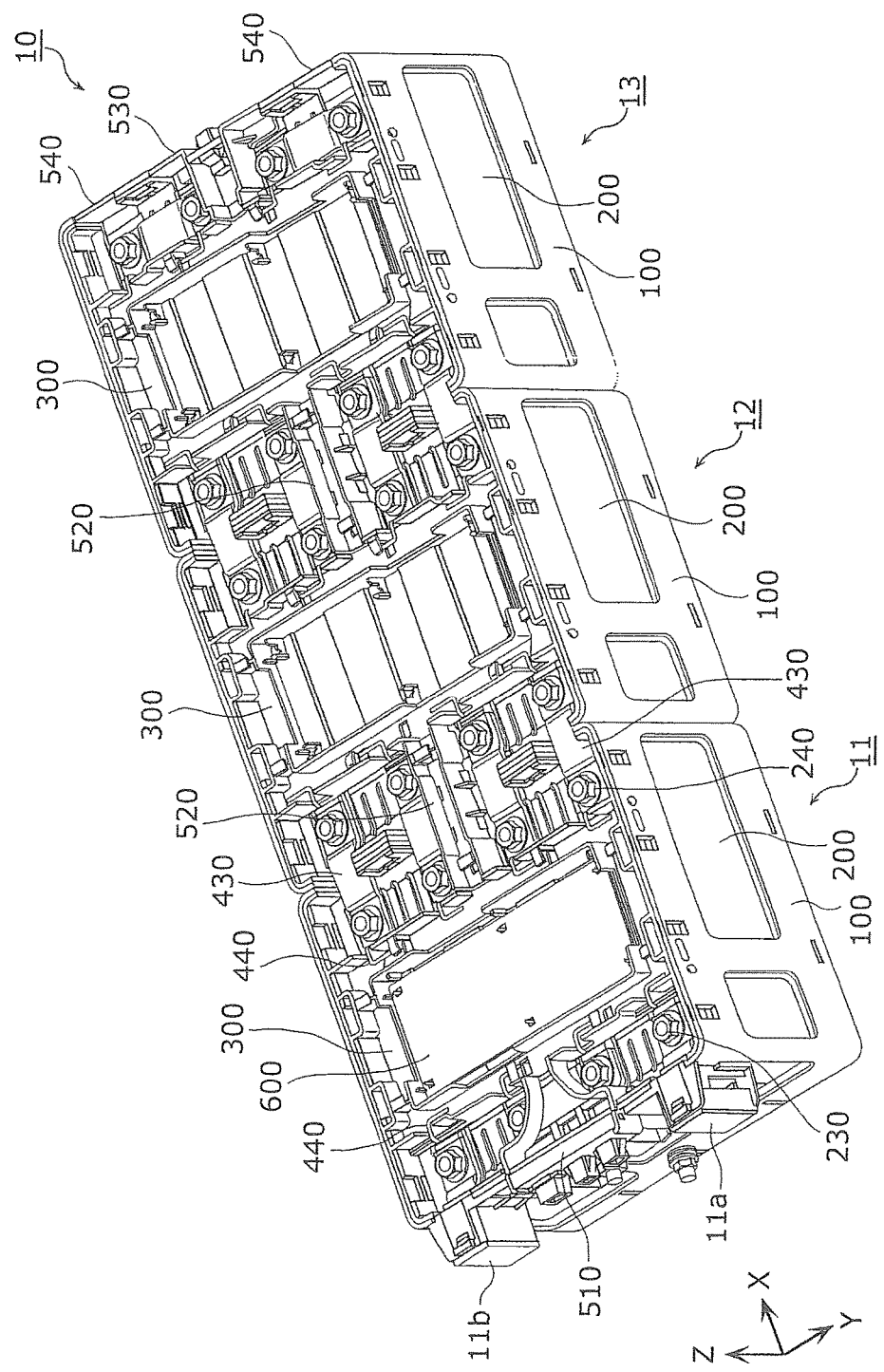
FIG. 3 is a perspective view illustrating internal structural components of module units.
Figure 4:
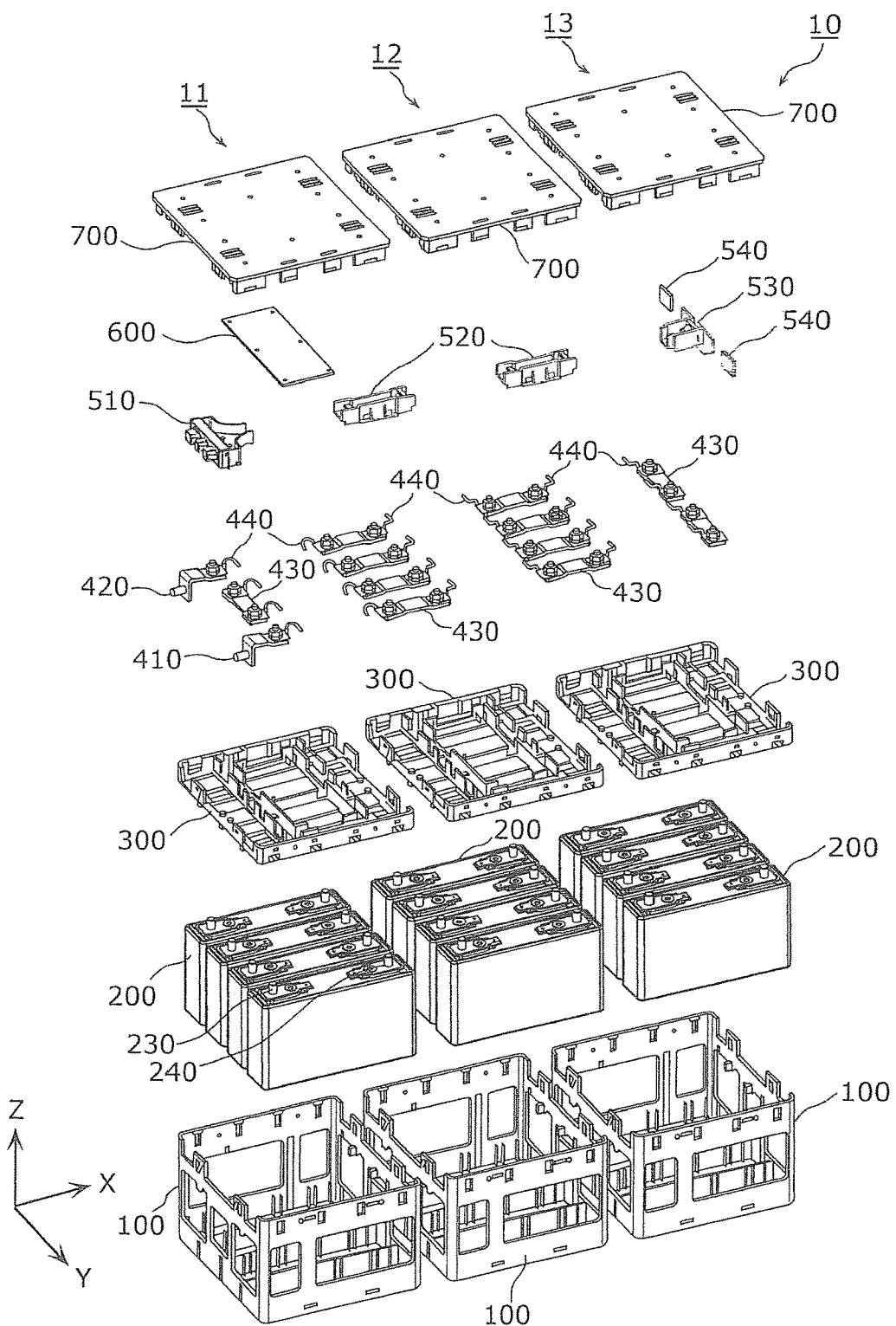
FIG. 4 is an exploded perspective view illustrating structural components of the module units.

FIG. 3 is a perspective view illustrating internal structural components of the module group 10 according to the embodiment of the present invention. More specifically, FIG. 3 illustrates the module group 10 with covers 700 removed so as to show the internal configuration of the module group 10. FIG. 4 is an exploded perspective view illustrating structural components of the module group 10.

As is illustrated in FIG. 3 and FIG. 4, each of the module units 11, 12, and 13 included in the module group 10 includes: the module case 14 including a case main body 100 and the cover 700; a plurality of energy storage devices 200 (in the embodiment, four of the energy storage devices 200 are provided) housed in the module case 14; a restricting component 300; and bus bars 430. The module group 10 further includes an external wiring connection component 510 provided in the module unit 11, a substrate 600 provided in the module unit 11, a wiring duct 520 bridging the module units 11, 12, and 13, an external wiring connection component 530 provided in the module unit 13, and a closure 540 provided in the module unit 13.

Here, the external wiring connection components 510 and 530 and the wiring duct 520 are wiring connection components for connecting together (i) first wiring 440 that is connected to at least one of the plurality of energy storage devices 200 and (ii) external second wiring. In other words, the module units 11, 12, and 13 include, as the wiring connection component, at least one of the external wiring connection component 510, the external wiring connection component 530, and the wiring duct 520.

The module case 14 is a rectangular (box-shaped) container acting as an outer housing for the module units 11, 12, and 13. The module case 14 arranges the energy storage devices 200 and the substrate 600 and such in given positions and protects the energy storage devices 200 and the substrate 600 and such from impact. The module case 14 is made of a material having insulating properties, such as a resin, like polycarbonate, for example. This keeps the energy storage device 200 and the substrate 600 and such from coming into contact with, for example, external metal components.

Here, the module case 14 includes the case main body 100 and the cover 700. The case main body 100 is a rectangular, tubular component having a bottom, and serves as the main body of the module case 14. The cover 700 is a low-profile, rectangular component that covers the opening of the case main body 100, and serves as the cover of the module case 14.

More specifically, the energy storage devices 200, the restricting component 300, and the bus bars 430 are arranged in this order in the case main body 100, and then the opening of the case main body 100 is closed off with the cover 700. Arranging the heavy energy storage devices 200 on the bottom in this way improves the stability of the module units 11, 12, and 13.

Each energy storage device 200 is a battery cell including a positive terminal 230 and a negative terminal 240. A plurality of the energy storage devices 200 are housed in the module cases 14 of the module units 11, 12, and 13. It should be noted that one energy storage device 200 may be housed in the module case 14 instead of a plurality of the energy storage devices 200. Moreover, each of the module units 11, 12, and 13 may include a different number of energy storage devices 200. The configuration of the energy storage devices 200 will be described in detail later.

The bus bars 430 are arranged above the restricting component 300. The bus bars 430 are made of a conductive material, such as metal, and electrically connect the energy storage devices 200 together. More specifically, the bus bar 430 connects the positive terminal 230 or negative terminal 240 of one of two adjacently arranged energy storage devices 200 to the negative terminal 240 or positive terminal 230 of the other of the two adjacently arranged energy storage devices 200.

The module unit 11 moreover includes an external positive terminal 410 arranged in the external positive terminal cover 11a and an external negative terminal 420 arranged in the external negative terminal cover 11b. The external positive terminal 410 and the external negative terminal 420 are electrode terminals for charging the energy storage apparatus 1 with electricity from an external source and discharging electricity to an external device. In other words, the energy storage apparatus 1 is charged with electricity from an external source and discharges electricity to an external device via the external positive terminal 410 and the external negative terminal 420.

More specifically, among the energy storage devices 200 included in the energy storage apparatus 1, the positive terminal 230 of the energy storage device 200 positionally corresponding to the external positive terminal 410 is connected to the external positive terminal 410, and the negative terminal 240 of the same energy storage device 200 is connected to the positive terminal 230 of an adjacent energy storage device 200 with the bus bar 430. Similarly, among the energy storage devices 200 included in the energy storage apparatus 1, the negative terminal 240 of the energy storage device 200 positionally corresponding to the external negative terminal 420 is connected to the external negative terminal 420, and the positive terminal 230 of the same energy storage device 200 is connected to the negative terminal 240 of an adjacent energy storage device 200 with the bus bar 430. The positive terminal 230 or the negative terminal 240 of other energy storage devices 200 are connected to the negative terminal 240 or the positive terminal 230 of an adjacent energy storage device 200 with the bus bar 430.

The restricting component 300 is a low-profile, rectangular component arranged above the energy storage devices 200. The restricting component 300 is made of a material having insulating properties, such as resin. Here, the restricting component 300 is a component that restricts the positioning of the energy storage devices 200 included in the case main body 100. More specifically, the restricting component 300 fits inside the case main body 100 and holds down the energy storage device 200 from above, thereby fixing the energy storage devices 200 to the case main body 100.

The substrate 600 is mounted on and the external wiring connection component 510 is attached to the restricting component 300 of the module unit 11. Moreover, the wiring ducts 520 are attached so as to bridge the restricting components 300 of the module units 11 and 12 and bridge the restricting components 300 of the module units 12 and 13. Furthermore, the external wiring connection component 530 and the closures 540 are attached to the restricting component 300 of the module unit 13.

In this way, the restricting component 300 functions to fix the energy storage devices 200 to the case main body 100, functions as a mounting plate for mounting the substrate 600, and functions as an attachment plate for attaching the external wiring connection components 510 and 530, the wiring duct 520, and the closure 540. The configuration of the restricting component 300, the external wiring connection components 510 and 530, the wiring duct 520, and the closure 540 will be described in detail later.

The substrate 600 is a control substrate for monitoring purposes that obtains the charging state and discharging state (the state of the battery, such as voltage or temperature) of the energy storage devices 200 included in the module group 10. The substrate 600 is provided with a control circuit (not shown in the drawings) for performing the above-described monitoring, controlling the on and off states of a relay, or communicating with other devices.

More specifically, the substrate 600 is located in the space between the positive terminals 230 and the negative terminals 240 of the energy storage devices 200, and is connected to these energy storage devices 200 and to the external wiring connection component 510 via the first wiring 440. In other words, the first wiring 440 is wiring including a lead wire connecting the positive terminal 230 or the negative terminal 240 of the energy storage device 200 to the substrate 600, and a cable connecting the substrate 600 to the external wiring connection component 510. It should be noted that in FIG. 3 and FIG. 4, the illustration of the first wiring 440 is partially omitted.

In other words, the first wiring 440 connected to the positive terminals 230 or the negative terminals 240 of the energy storage devices 200 included in the module unit 11 extends along the perimeter of the substrate 600 and is connected to the external wiring connection component 510 via the substrate 600.

Moreover, the first wiring 440 connected to the positive terminals 230 or the negative terminals 240 of the energy storage devices 200 included in the module unit 12 extends along the wiring path in the wiring duct 520 bridging the module unit 11 and 12, and is connected to the external wiring connection component 510 via the substrate 600.

Moreover, the first wiring 440 connected to the positive terminals 230 or the negative terminals 240 of the energy storage devices 200 included in the module unit 13 extends along the wiring path in the wiring duct 520 bridging the module unit 12 and 13 and along the wiring path in the wiring duct 520 bridging the module unit 11 and 12, and is connected to the external wiring connection component 510 via the substrate 600.

Similarly, the cable connected to the external wiring connection component 530 located in the module unit 13 extends along the wiring path in the wiring duct 520 bridging the module unit 12 and 13 and along the wiring path in the wiring duct 520 bridging the module unit 11 and 12, and is connected to the external wiring connection component 510 via the substrate 600.

The external wiring connection component 510 is connected to external second wiring (for example, the second wiring 50 to be described later). In other words, the external wiring connection component 510 is a component that connects together (i) the first wiring 440 connected to at least one of the one or more energy storage devices 200 and (ii) the external second wiring.

Here, the external wiring connection component 510 is located on a side of the energy storage apparatus 1, which is an end of the apparatus 1 in a direction in which the positive terminal 230 and the negative terminal 240 are aligned (X axis). In other words, the external wiring connection component 510 is located on a short side of the energy storage apparatus 1 (located on the side in the negative direction of the X axis). More specifically, the external wiring connection component 510 is detachably attached to the side of the module unit 11, which is an outermost one of the module units 11, 12, and 13 (outermost in the direction of alignment of the module units), in the negative direction of the X axis.

Moreover, the substrate 600 is located on the restricting component 300 of the module unit 11, and arranged so as to be covered by the cover 700 of the module unit 11. In other words, the substrate 600 is disposed in the module unit 11, which is, among the module units 11, 12, and 13, the module unit provided with the external wiring connection component 510 and located upstream with respect to the flow of the coolant (air) introduced by the cooling apparatus 40.

In this way, the substrate 600 is arranged so as to be protected by the restricting component 300 and the cover 700 as a result of being sandwiched between the restricting component 300 and the cover 700 of the module unit 11. It should be noted that disposition of the substrate 600 is not limited to the module unit 11. The substrate 600 may be disposed in the module unit 12 or the module unit 13, and may be disposed in the module unit 12 and the module unit 13 in addition to the module unit 11.

Next, the configuration of the energy storage device 200 will be described in detail.

Figure 5:
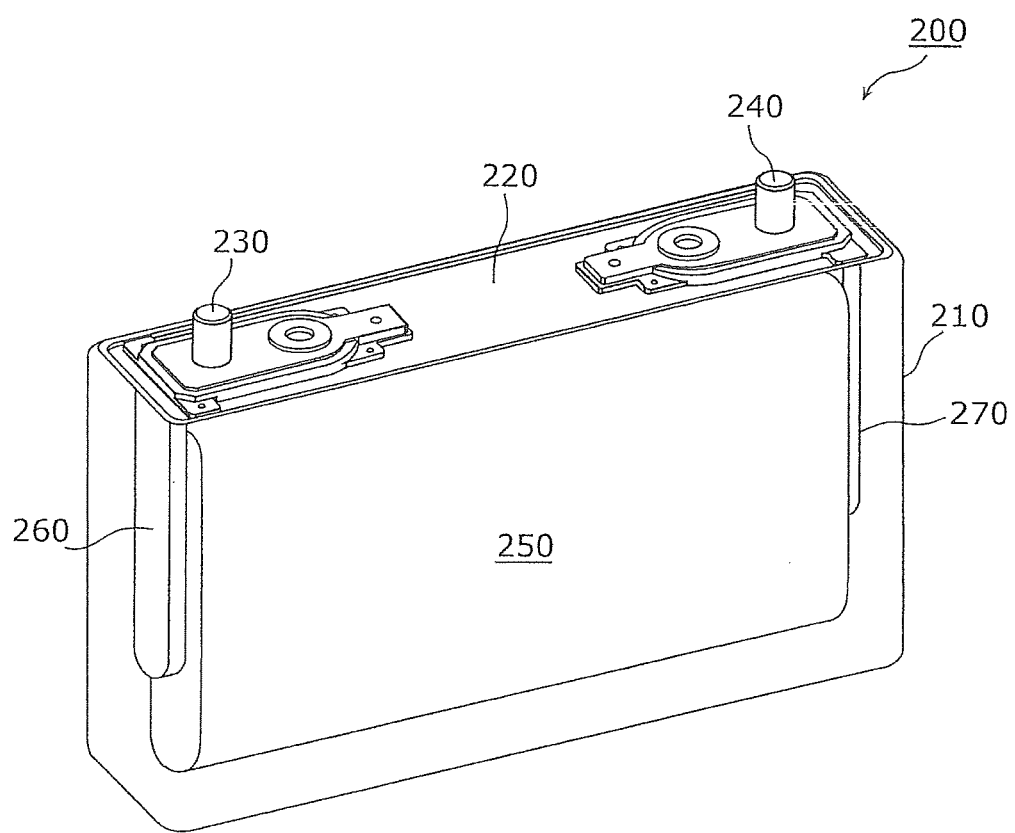
FIG. 5 is a transparent perspective view illustrating the inside of an energy storage device.

FIG. 5 is a transparent perspective view illustrating the inside of the energy storage device 200 according to the embodiment of the present invention.

The energy storage device 200 is a secondary battery (battery cell) capable of charging and discharging electricity. More specifically, the energy storage device 200 is a non-aqueous electrolyte secondary battery such as a lithium ion secondary battery. It should be noted that the energy storage device 200 is not limited to a non-aqueous electrolyte secondary battery. The energy storage device 200 may be a secondary battery other than a non-aqueous electrolyte secondary battery, such as a capacitor.

As is illustrated in FIG. 5, the energy storage device 200 includes a container 210, the positive terminal 230, and the negative terminal 240. The container 210 includes, as a top wall, a container lid 220. Additionally, an electrode assembly 250, a positive current collector 260, and a negative current collector 270 are arranged in the container 210. It should be noted that even though it is not shown in the drawings, the container 210 contains a liquid such as an electrolyte.

The container 210 is configured of a rectangular, tubular metal chassis main body having a bottom, and a container lid 220, which is metallic and hermetically seals the opening of the chassis main body. Moreover, after insertion of the electrode assembly 250 and such, the inside of the container 210 is sealed by, for example, welding the container lid 220 to the chassis main body. It should be noted that the material used for the container 210 is not particularly limited to a certain material, but is preferably a weldable metal such as stainless steel or aluminum.

The electrode assembly 250 is a power generating element capable of storing electricity, and includes a positive electrode, a negative electrode, and a separator. More specifically, the electrode assembly 250 is a wound electrode assembly formed by winding, into an oblong shape, a laminate including the negative electrode, the positive electrode, and the separator interposed therebetween. It should be noted that the electrode assembly 250 may be a stacked electrode assembly in which flat electrode plates are layered.

Here, the positive electrode is a long, belt-shaped positive electrode base material foil made of aluminum or an aluminum alloy with a positive electrode active material layer formed on a surface thereof. The negative electrode is a long, belt-shaped negative electrode base material foil made of copper or a copper alloy with a negative electrode active material layer formed on a surface thereof. The separator is a microporous sheet. It should be noted that the positive electrode, the negative electrode, and the separator used in the energy storage device 200 are not particularly different from conventional positive electrodes, negative electrodes, and separators, and so long as the performance of the energy storage device 200 is not inhibited, well-known materials may be used. Moreover, so long as it does not inhibit the performance of the energy storage device 200, the electrolyte (non-aqueous electrolyte) enclosed in the container 210 is not particular limited to a certain type; a variety of electrolytes may be used.

The positive terminal 230 is an electrode terminal that is electrically connected to the positive electrode in the electrode assembly 250 via the positive current collector 260, and the negative terminal 240 is an electrode terminal that is electrically connected to the negative electrode in the electrode assembly 250 via the negative current collector 270. Both the positive terminal 230 and the negative terminal 240 are connected to the container lid 220. In other words, the positive terminal 230 and the negative terminal 240 are metallic electrode terminals for leading electricity stored in the electrode assembly 250 out of the energy storage device 200 and introducing electricity into the energy storage device 200 to be stored in the electrode assembly 250.

The positive current collector 260 is a rigid component having conductive properties that is electrically connected to the positive terminal 230 and the positive electrode, and positioned between the positive electrode of the electrode assembly 250 and a side wall of the container 210. It should be noted that, similar to the positive electrode current collector foil of the positive electrode, the positive current collector 260 is made of aluminum. Moreover, the negative current collector 270 is a rigid component having conductive properties that is electrically connected to the negative terminal 240 and the negative electrode of the electrode assembly 250, and positioned between the negative electrode of the electrode assembly 250 and a side wall of the container 210. It should be noted that, similar to the negative electrode current collector foil of the negative electrode, the negative current collector 270 is made of copper.

Next, the configuration of the restricting component 300, the external wiring connection components 510 and 530, the wiring duct 520, and the closure 540 will be described in detail. First, the manner in which the external wiring connection components 510 and 530, the wiring duct 520, and the closure 540 are attached to the restricting component 300 will be described in detail.

Figure 6:
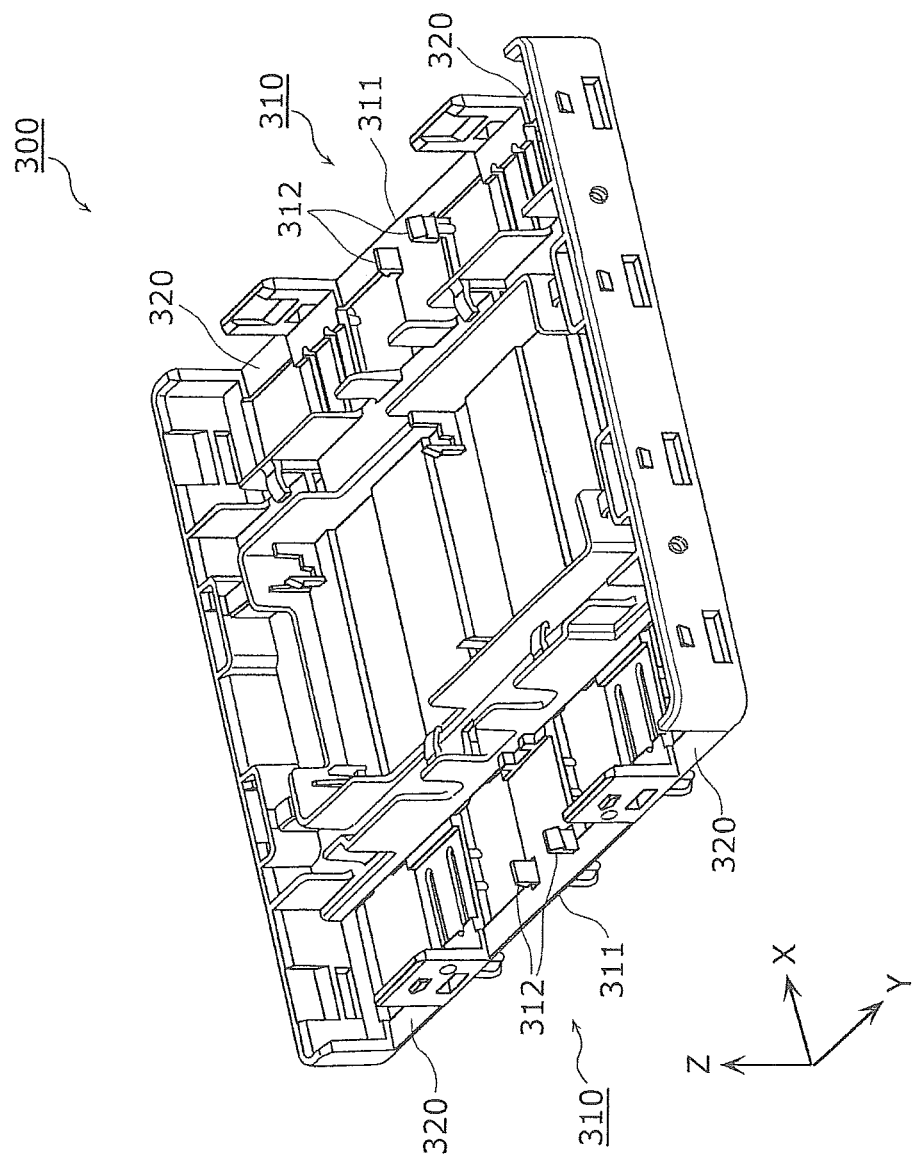
FIG. 6 is a perspective view illustrating the external appearance of a restricting component.
Figure 7:
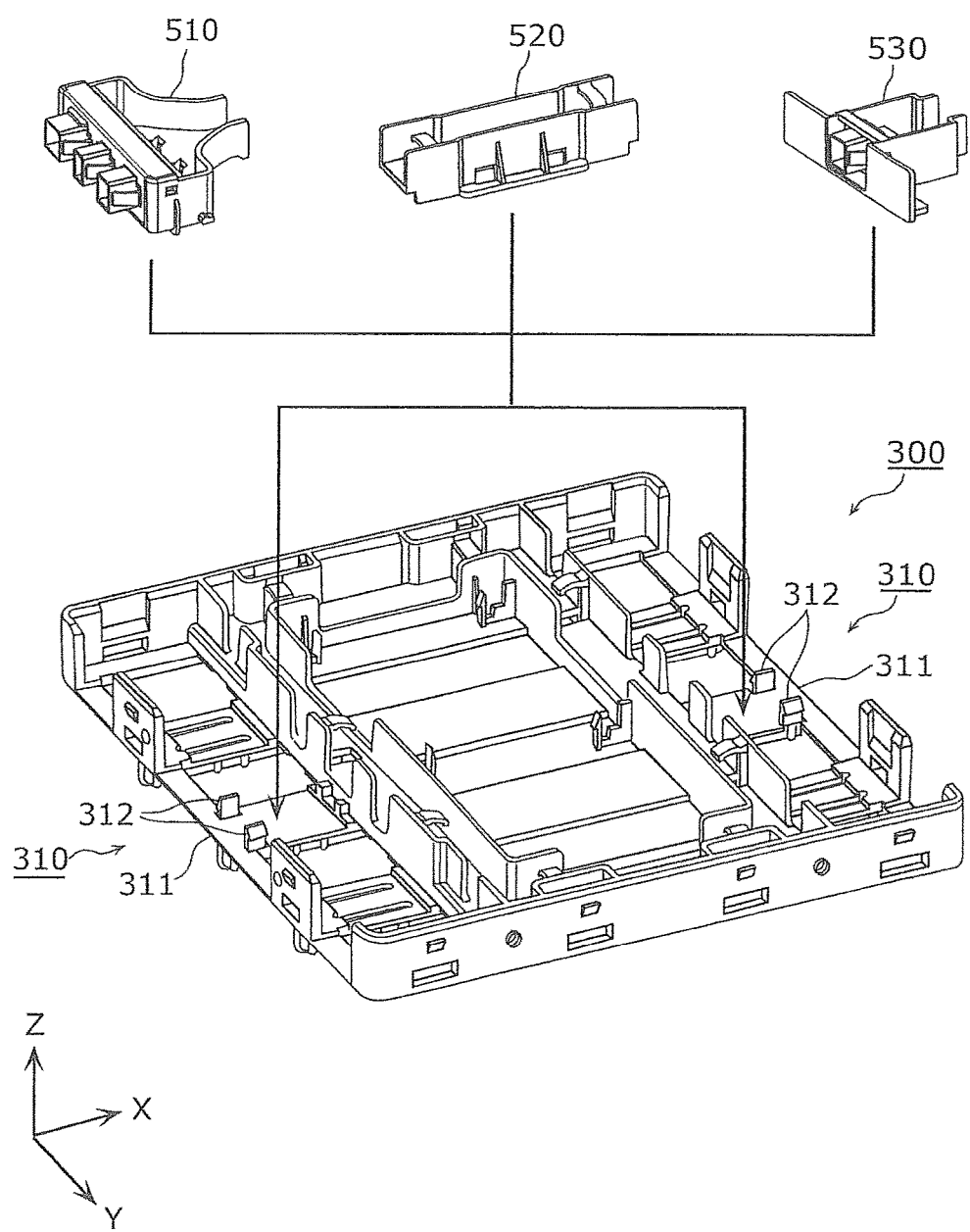
FIG. 7 is a perspective view illustrating the manner in which external wiring connection components and a wiring duct are attached to the restricting component.

FIG. 6 is a perspective view illustrating the external appearance of the restricting component 300 according to the embodiment of the present invention. FIG. 7 is a perspective view illustrating the manner in which the external wiring connection components 510 and 530 and the wiring duct 520 can be attached to the restricting component 300.

In FIG. 6 and FIG. 7, the restricting component 300 includes two attachment portions 310, one on each side located along the X axis. The attachment portion 310 is a section of the restricting component 300 to which the external wiring connection component 510 detachably attaches, and includes a rectangular opening 311 and a protrusion 312 for attaching the external wiring connection component 510.

Furthermore, the external wiring connection component 530 and the wiring duct 520 are also detachably attachable to the attachment portion 310. In other words, each of the module units 11, 12, and 13 includes two attachment portions 310 to which the external wiring connection component 510, the external wiring connection component 530, and the wiring duct 520 are detachably attachable. The rectangular opening 311 and the protrusion 312 for attaching the external wiring connection component 510 and 530 and the wiring duct 520 are formed on the attachment portion 310.

Here, as is illustrated in FIG. 3, the external wiring connection component 510 and 530 are detachably attached to the attachment portion 310 of the module units 11 and 13, which are the two outermost ones of the module units 11, 12, and 13. In other words, the external wiring connection component 510 is detachably attached to, out of the module units 11, 12, and 13 including the attachment portion 310, the attachment portion 310 of an outermost one of the module units (the outermost module unit in the negative direction of the X axis). Moreover, the external wiring connection component 530 is detachably attached to, out of the module units 11, 12, and 13 including the attachment portion 310, the attachment portion 310 of an outermost one of the module units (the outermost module unit in the positive direction of the X axis).

Furthermore, out of the module units 11, 12, and 13 including the attachment portion 310, the wiring duct 520 is detachably attached to, so as to bridge, the two attachment portions 310 of adjacent ones of the module units arranged inward.

Moreover, as is illustrated in FIG. 6, the restricting component 300 includes openings 320 formed on both sides of the attachment portion 310 (at the four corners of the restricting component 300). The opening 320 is a rectangular opening into which the external positive terminal 410, the external negative terminal 420, the bus bar 430, or the closure 540 illustrated in FIG. 4 is inserted.

In other words, among the openings 320 of the attachment portions 310 included in the module unit 11, the external positive terminal 410 and the external negative terminal 420 are arranged at the two openings 320 in the negative direction of the X axis, and bus bars 430 are arranged at the two openings 320 in the positive direction of the X axis. Moreover, bus bars 430 are arranged at the four openings 320 of the attachment portions 310 included in the module unit 12.

Among the openings 320 of the attachment portions 310 included in the module unit 13, bus bars 430 are arranged at the two openings 320 in the negative direction of the X axis, and closures 540 are detachably attached to the two openings 320 in the positive direction of the X axis to close off the two openings 320. In other words, the closure 540 is a component for closing off an opening 320 in which an external positive terminal 410, external negative terminal 420, or bus bar 430 is not inserted, and is made of a material having insulating properties, such as resin.

Next, the configuration of the external wiring connection component 510 will be described in detail.

Figure 8:
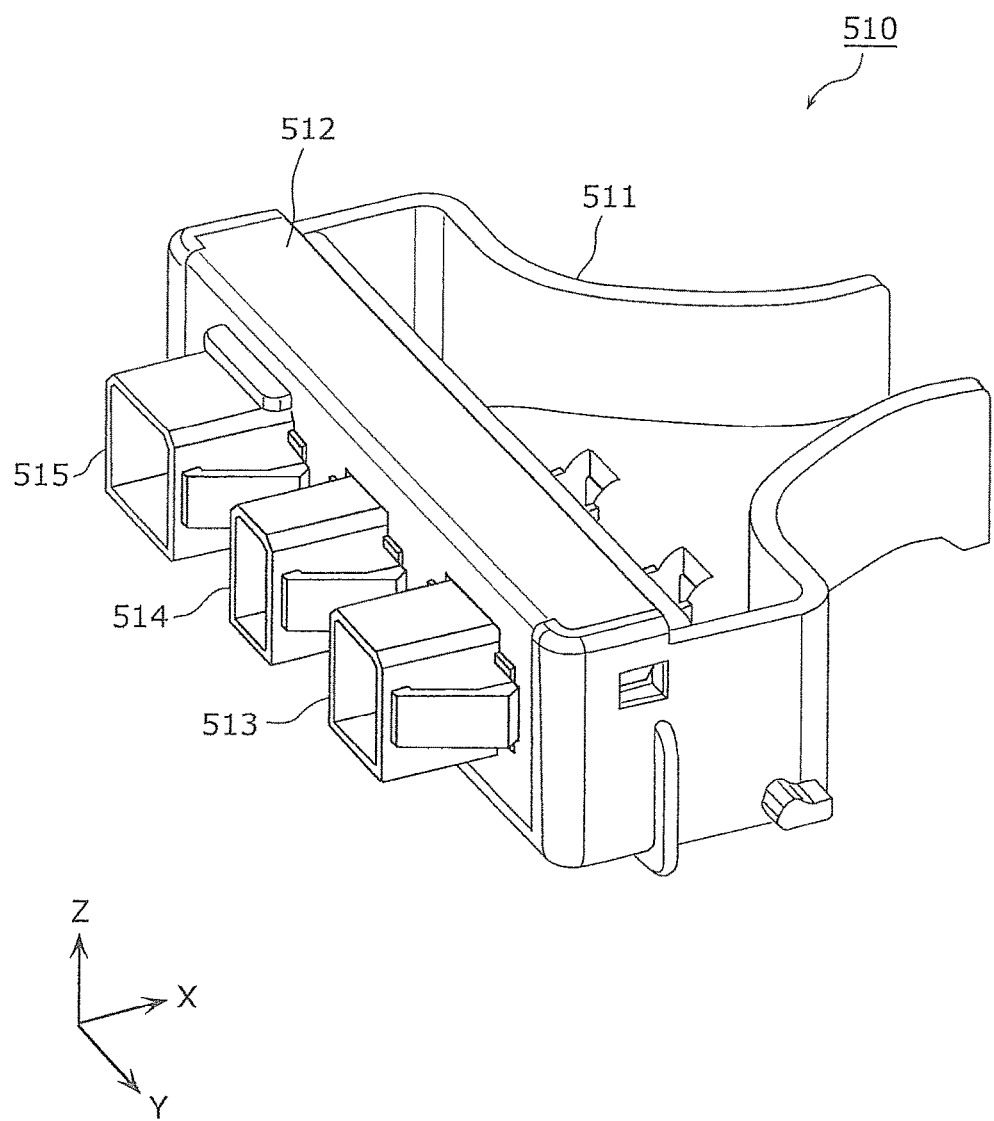
FIG. 8 is a perspective view illustrating the external appearance of the external wiring connection component.
Figure 9:
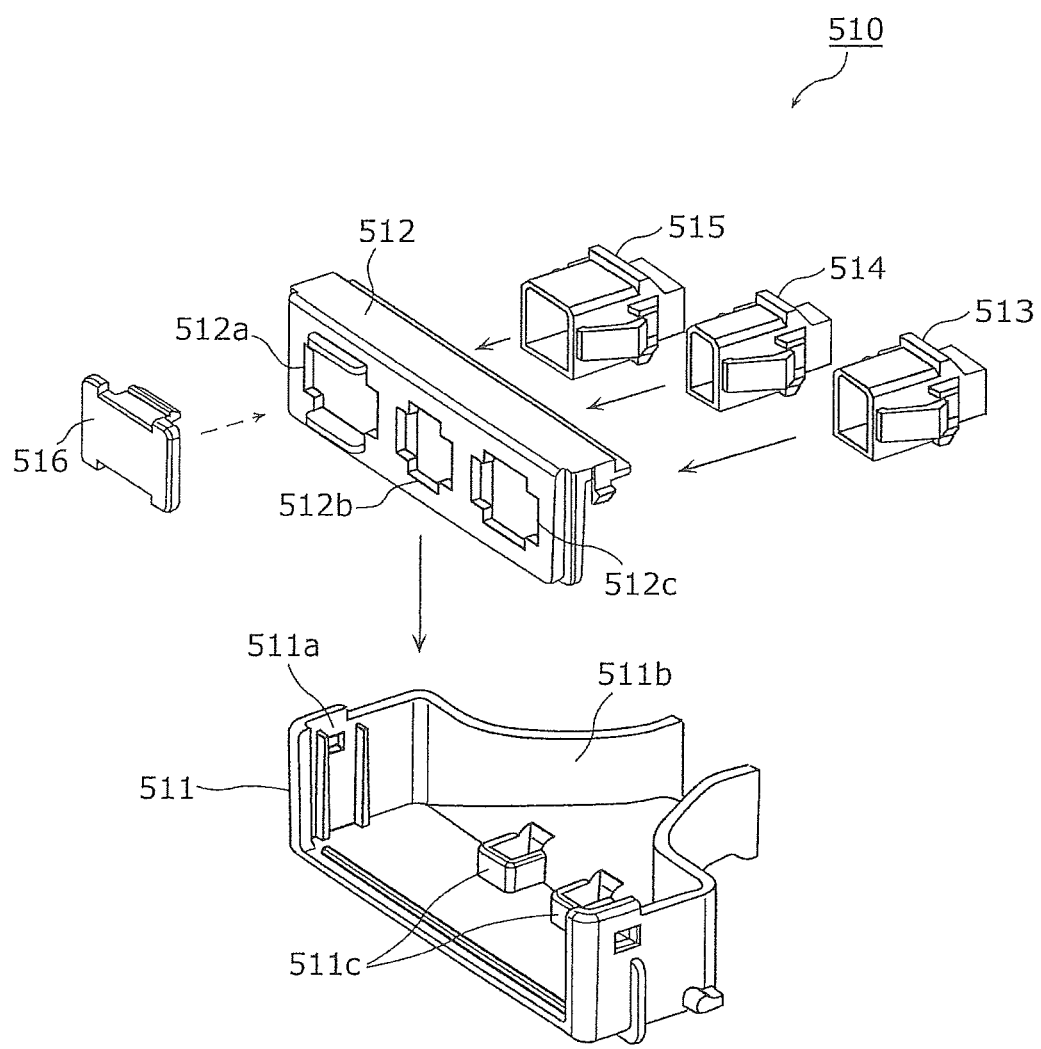
FIG. 9 is an exploded perspective view illustrating structural elements of the external wiring connection component.

FIG. 8 is a perspective view illustrating the external appearance of the external wiring connection component 510 according to the embodiment of the present invention. FIG. 9 is an exploded perspective view illustrating structural elements of the external wiring connection component 510.

As is illustrated in FIG. 8 and FIG. 9, the external wiring connection component 510 includes a main body 511, a connector holder 512, and connectors 513 through 515. It should be noted that the external wiring connection component 510 is formed of a material having insulating properties, such as resin.

The main body 511 forms the main body of the external wiring connection component 510, and as is illustrated in FIG. 9, includes a connector holder attachment portion 511a, a guide portion 511b, and an engagement portion 511c.

The connector holder attachment portion 511a is a section of the main body 511 to which the connector holder 512 detachably attaches. In other words, the connector holder 512 attaches to the main body 511 by the connector holder 512 being inserted into a grove formed in the connector holder attachment portion 511a.

The guide portion 511b is a curved section of the main body 511 that guides the first wiring 440 to a wiring path thereof. In other words, upon connecting the first wiring 440 extending from the substrate 600 to the connectors 513 through 515, the first wiring 440 is wired along the curved guide portion 511b.

The engagement portion 511c is a through hole that engages the protrusion 312 of the attachment portion 310. In other words, the external wiring connection component 510 attaches to the attachment portion 310 of the restricting component 300 by the engagement portion 511c engaging the protrusion 312.

The connector holder 512 is for holding the connectors 513 through 515. More specifically, the connector holder 512 includes three rectangular openings 512a through 512c for insertion of the connectors 513 through 515. The connector holder 512 holds the connectors 513 though 515 by the connectors 513 through 515 being inserted into respective ones of the openings 512a through 512c.

Each of the connectors 513 through 515 is a connector to which the first wiring 440 is connected. In other words, the first wiring 440 and the external second wiring are connected together by the second wiring being connected to the connectors 513 through 515. The connector 513 is, for example, an input connector for transmission of an electrical signal from the external second wiring to the first wiring 440. The connector 514 is, for example, an output connector for transmission of an electrical signal from the first wiring 440 to the external second wiring. Each of the connectors 513 through 515 may have the same shape, or may have a different shape.

It should be noted that the external wiring connection component 510 is not required to include all three connectors 513 through 515. For example, the external wiring connection component 510 may be without the connector 515. In this case, since a connector is not attached to the opening 512a formed in the connector holder 512, the external wiring connection component 510 may be provided with a blocking component 516 that blocks the opening 512a not connected with a connector.

Next, the configuration of the wiring duct 520 will be described in detail.

Figure 10:
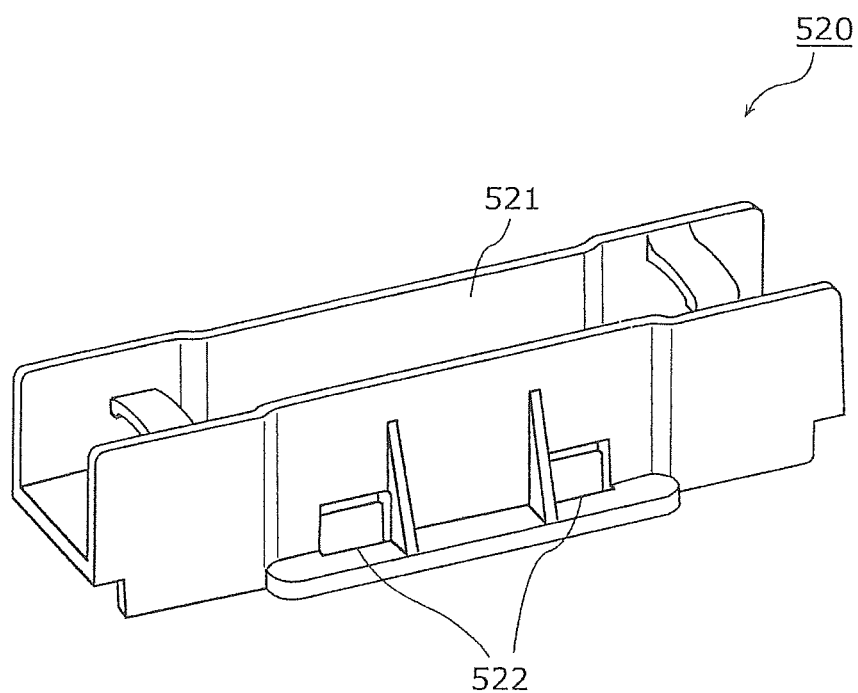
FIG. 10 is a perspective view illustrating the external appearance of the wiring duct.

FIG. 10 is a perspective view illustrating the external appearance of the wiring duct 520 according to the embodiment of the present invention.

The wiring duct 520 is a component that is arranged bridging two of the module units 11, 12, and 13, and forms a path for wiring passing between the two module units. In other words, the wiring duct 520 detachably attaches to and bridges two adjacent ones of the attachment portions 310 included in two adjacent ones of the module units 11, 12, and 13.

As is illustrated in FIG. 10, the wiring duct 520 includes a wiring path 521 and an engagement portion 522. It should be noted that the wiring duct 520 is formed of a material having insulating properties, such as resin.

The wiring path 521 is a wiring path for the first wiring 440, and is formed inside the wiring duct 520. In other words, the wiring path 521 is a straight path for guiding, to the substrate 600 disposed in the module unit 11, the first wiring 440 connected to the positive terminals 230 and the negative terminals 240 of the energy storage devices 200 in the module units 12 and 13.

The engagement portion 522 is a through hole that engages the protrusion 312 of the attachment portion 310. In other words, the external wiring duct 520 attaches to the attachment portion 310 of the restricting component 300 by the engagement portion 522 engaging the protrusion 312.

Next, the configuration of the external wiring connection component 530 will be described in detail.

Figure 11:
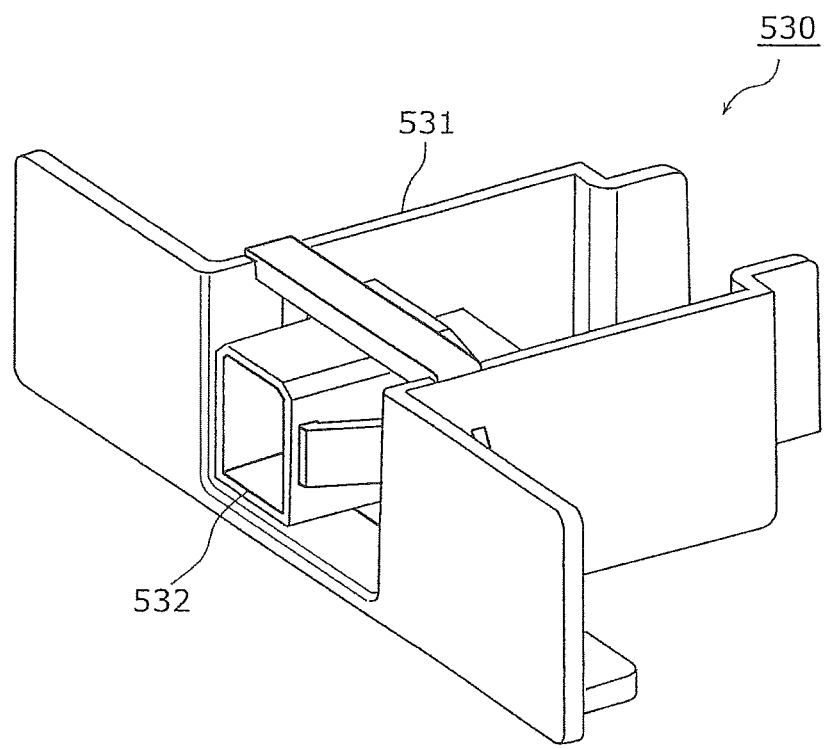
FIG. 11 is a perspective view illustrating the external appearance of the external wiring connection component.
Figure 12:
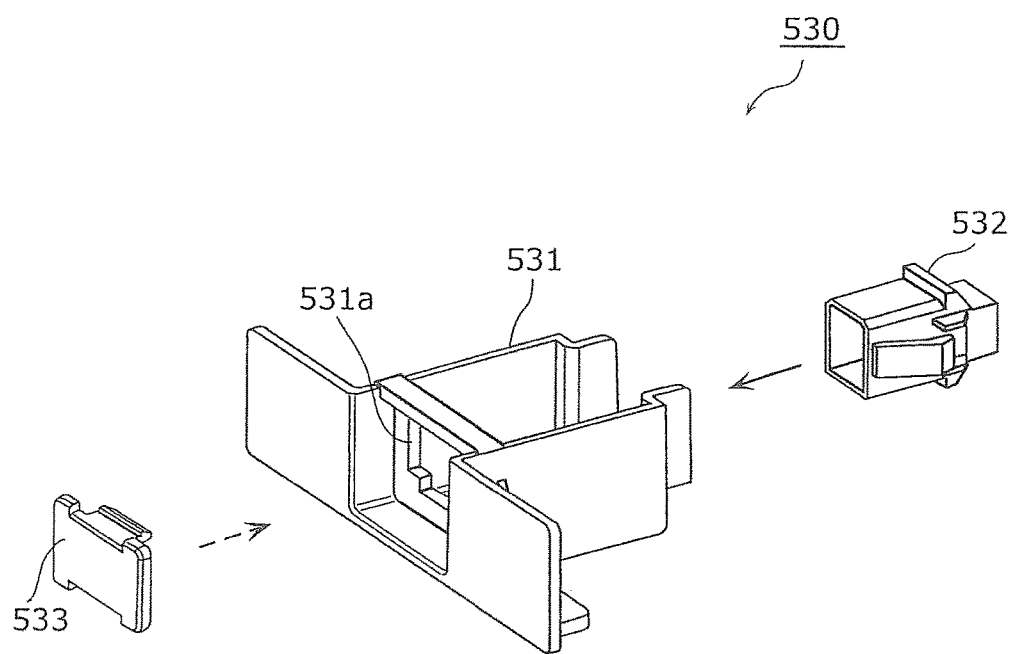
FIG. 12 is an exploded perspective view illustrating structural elements of the external wiring connection component.

FIG. 11 is a perspective view illustrating the external appearance of the external wiring connection component 530 according to the embodiment of the present invention. FIG. 12 is an exploded perspective view illustrating structural elements of the external wiring connection component 530.

As is illustrated in FIG. 11 and FIG. 12, the external wiring connection component 530 includes a main body 531 and a connector 532. It should be noted that the external wiring connection component 530 is formed of a material having insulating properties, such as resin.

The main body 531 forms the main body of the external wiring connection component 530, and as is illustrated in FIG. 12, includes a rectangular opening 531a into which the connector 532 is inserted. In other words, the main body 531 holds the connector 532 by the connector 532 being inserted into the opening 531a.

Similar to the external wiring connection component 510 and the wiring duct 520, the main body 531 also includes an engagement portion (not shown in the drawings) that is a through hole that engages the protrusion 312 of the attachment portion 310. In other words, the external wiring connection component 530 attaches to the attachment portion 310 of the restricting component 300 by the engagement portion engaging the protrusion 312.

The connector 532 is connected to wiring from the substrate 600, and, for example, connecting a cable from the external cooling apparatus 40 to the connector 532 makes it is possible to transmit an electrical signal from the substrate 600 to the cooling apparatus 40.

It should be noted that when the energy storage apparatus 1 does not include the cooling apparatus 40, the external wiring connection component 530 is not required to include the connector 532. In this case, since a connector is not attached to the opening 531a formed in the main body 531, the external wiring connection component 530 may be provided with a blocking component 533 that blocks the opening 531a not connected with a connector.

With this, the external wiring connection component 530 functions as a blocking component that blocks the opening 311 formed in the attachment portion 310 of the restricting component 300. In other words, in this case, the module group 10 includes the external wiring connection component 530 as a blocking component that blocks, among the openings 311 formed in the attachment portions 310, an opening 311 not at which neither the external wiring connection component 510 nor the wiring duct 520 is attached.

Next, an application example of the energy storage apparatus 1 will be given.

Figure 13:
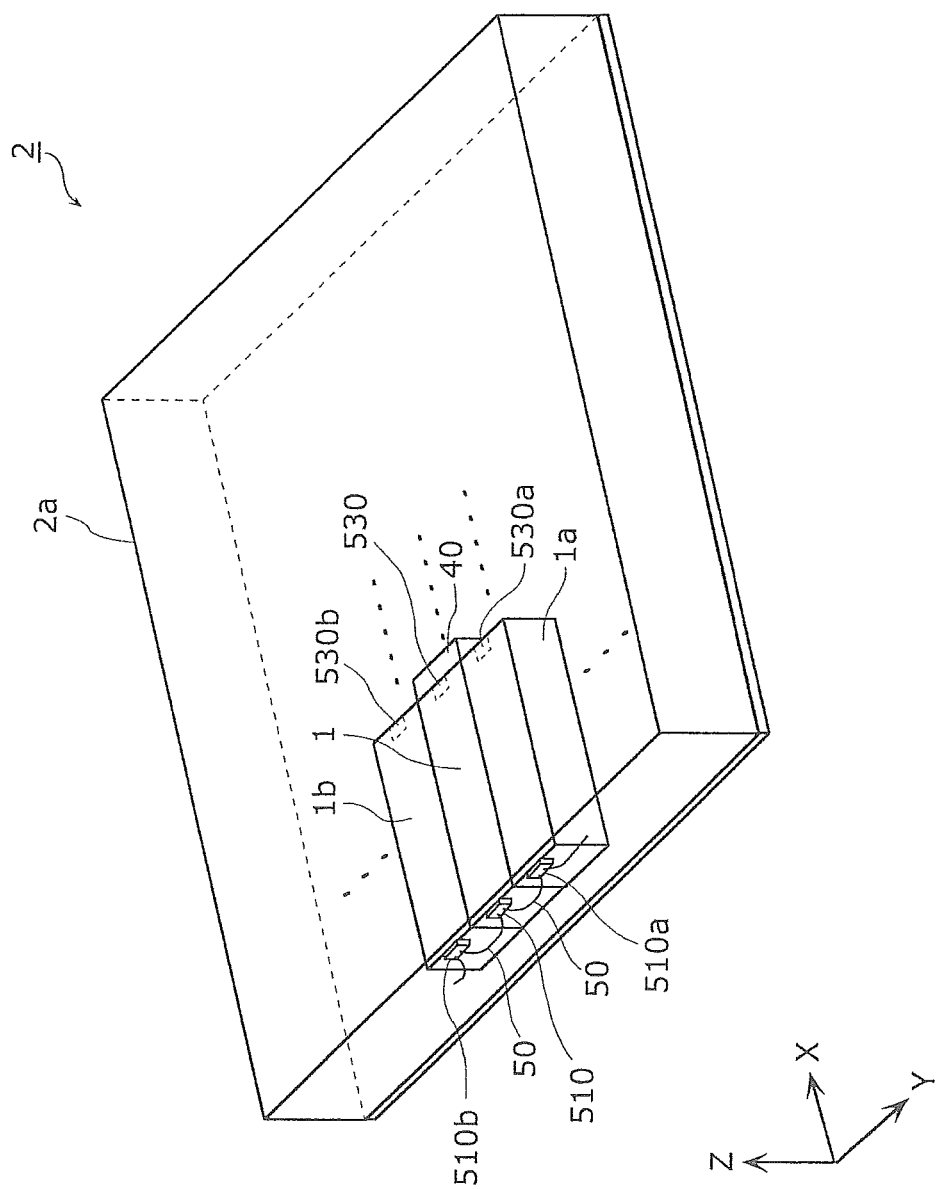
FIG. 13 is a perspective view illustrating the configuration of an energy storage pack including the energy storage apparatus.

First, an example in which the energy storage apparatus 1 is used while housed in the energy storage pack including a plurality of energy storage apparatuses. FIG. 13 is a perspective view illustrating the configuration of an energy storage pack 2 including the energy storage apparatus 1 according to the embodiment of the present invention.

As is illustrated in FIG. 13, the energy storage pack 2 is a large power source apparatus in which a plurality of energy storage apparatuses (for example, ten to forty) are arranged in an array. The energy storage pack 2 is a battery pack used to store energy and/or used as a power source, for example. The external positive terminals 410 and external negative terminals 420 of adjacent ones of the energy storage apparatuses are electrically connected together to form the high-voltage energy storage pack 2. It should be noted that the number of energy storage apparatuses included in the energy storage pack 2 is not particularly limited to a given number.

Here, the energy storage pack 2 includes the energy storage apparatus 1, energy storage apparatuses 1a and 1b, and a pack case 2a that houses the energy storage apparatuses 1, 1a, and 1b. The energy storage apparatuses 1a and 1b are different from the energy storage apparatus 1.

For example, the energy storage apparatuses 1a and 1b are different from the energy storage apparatus 1 in that they do not include the cooling apparatus 40. For this reason, the external wiring connection components 530a and 530b included in the energy storage apparatuses 1a and 1b are provided with a blocking component 533 as a substitute for the connector 532 illustrated in FIG. 12, to close the opening 311 of the attachment portion 310.

In other words, by configuring the external wiring connection component to be detachably attached, the design flexibility of the energy storage apparatus can be increased. For example, this makes it possible to attach a temperature regulating device, such as the cooling apparatus 40, to a part of a given one of the energy storage apparatuses.

Moreover, assume that the energy storage apparatuses in the energy storage pack 2 have a master-slave relationship, and, for example, the energy storage apparatus 1 is the master and the energy storage apparatuses 1a and 1b are the slaves. In other words, the external wiring connection component 510 included in the energy storage apparatus 1 is required to have a master connector and the external wiring connection components 510a and 510b included in the energy storage apparatuses 1a and 1b are required to have slave connectors.

In this case, it is possible to configure the energy storage apparatuses by changing the shape of the connector that inserts into the connector holder of the external wiring connection component included in each energy storage apparatus, or changing the connector holder to a connector holder that holds a master or slave connector.

Then, second wiring 50 connected to the external wiring connection components 510a and 510b of the energy storage apparatuses 1a and 1b are connected to the external wiring connection component 510 of the energy storage apparatus 1, thereby connecting the external second wiring 50 to the first wiring 440 of the energy storage apparatus 1.

In other words, in the energy storage pack 2 which includes the energy storage apparatus 1 and the energy storage apparatuses 1a and 1b, which are different from the energy storage apparatus 1, when the external wiring connection component 510 is attached to the attachment portion 310, the wiring connection component 510 connects the first wiring 440, which is connected to the wiring connection component 510, and the second wiring 50, which is also connected to the wiring connection component 510 and to the energy storage apparatuses 1a and 1b.

Figure 14:
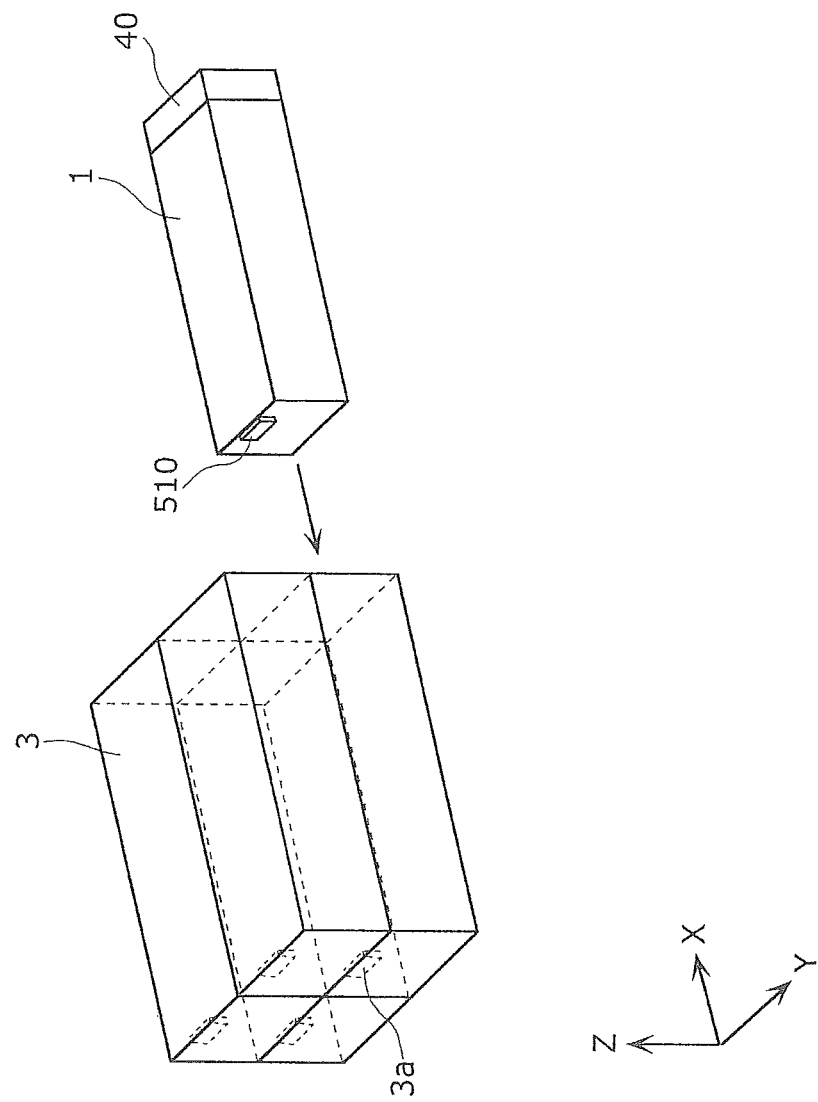
FIG. 14 is a perspective view illustrating the configuration of a stacked housing in which the energy storage apparatus is housed.

Next, an application example of the energy storage apparatus 1 when housed in a stacked housing will be given. FIG. 14 is a perspective view illustrating the configuration of a stacked housing 3 in which the energy storage apparatus 1 according to the embodiment of the present invention is housed.

As is illustrated in FIG. 14, the stacked housing 3 is a housing with shelves in which the energy storage apparatus 1 is stored, and a connector 3a is provided on the surface in the back (in the negative direction of the X axis). When the energy storage apparatus 1 is inserted into the stacked housing 3 in the negative direction of the X axis, the external wiring connection component 510 located on a short side of the energy storage apparatus 1 connects to the connector 3a. With this, the first wiring 440 in the energy storage apparatus 1 and the external second wiring arranged at the connector 3a are connected.

It should be noted that since the cooling apparatus 40 pulls in air from the short side of the energy storage apparatus 1 (the back end of the stacked housing 3) including the external wiring connection component 510, it is possible to efficiently cool the inside of the energy storage apparatus 1.

As described above, with the energy storage apparatus 1 according to the embodiment of the present invention, the external wiring connection component 510 for connecting (i) the first wiring 440 connected to the energy storage devices 200 and (ii) the external second wiring is configured to be detachably attached to the attachment portion 310. For this reason, even if the configuration of the energy storage apparatus 1 is changed, it is possible to connect wiring designed for the configuration of the energy storage apparatus 1 by changing out the external wiring connection component 510. Moreover, when there is no need to connect wiring to the energy storage apparatus 1, it is possible to simplify the configuration of the energy storage apparatus 1 by, for example, removing the external wiring connection component 510, or attaching an external wiring connection component 510 to which unnecessary connectors are not attached. In this way, providing the detachably attachable external wiring connection component 510 increases the design flexibility of the energy storage apparatus 1.

Moreover, the external wiring connection component makes it is possible to connect together two energy storage apparatuses in the energy storage pack 2. In other words, even if the two energy storage apparatuses have different configurations, it is possible to connect the two energy storage apparatuses together by attaching external wiring connection components designed for the configurations of the energy storage apparatuses, thereby increasing the design flexibility of the energy storage apparatuses.

Moreover, the external wiring connection component 510 is configured such that the connector holder 512 holding the connectors 513 through 515 is detachably attachable to the main body 511. Consequently, even if the configuration of the energy storage apparatus 1 is changed, it is possible to connect wiring designed for the configuration of the energy storage apparatus 1 by changing out the connector holder 512. Moreover, when there is no need to connect wiring to the energy storage apparatus 1, it is possible to simplify the configuration of the energy storage apparatus 1 by, for example, removing the connector holder 512, or attaching a connector holder 512 to which unnecessary connectors are not attached. In this way, providing the detachably attachable connector holder 512 increases the design flexibility of the energy storage apparatus 1.

Moreover, since the main body 511 of the external wiring connection component 510 includes a curved guide portion 511b that guides the first wiring 440 to the wiring path thereof, the first wiring 440 can be easily connected to the external wiring connection component 510 without bending and such.

Moreover, the external wiring connection component 510 is located on a side of the energy storage apparatus 1, which is an end of the energy storage apparatus 1 in the direction in which the positive terminal 230 and the negative terminal 240 of the energy storage device 200 are aligned. Here, when the substrate 600 including the first wiring 440 is disposed in the space between the positive terminals 230 and the negative terminals 240 of the energy storage devices 200, the substrate 600 is not disposed at the end of the energy storage apparatus 1 in the above-described direction of alignment. Consequently, in a configuration in which the connector is provided on the substrate 600, the positive terminals 230 and the negative terminals 240 are obstructive, making it difficult to connect the second wiring from the side (end) of the energy storage apparatus 1 in the above-described direction of alignment. However, by disposing the external wiring connection component 510 on the side of the energy storage apparatus 1 in the above described direction of alignment, the positive terminals 230 and the negative terminals 240 of the energy storage devices 200 are not obstructive even when the substrate 600 is disposed in the space between the positive terminals 230 and the negative terminals 240, and the second wiring can be easily connected from the side of the energy storage apparatus 1 in the above-described direction of alignment. As such, even when the second wiring is arranged on the side of the energy storage apparatus 1 in the above-described direction of alignment, the second wiring can be easily connected from the side of the energy storage apparatus 1 in the above-described direction of alignment by connecting the second wiring to the connector of the external wiring connection component 510.

Moreover, since the external wiring connection component 510 is located on a short side of the energy storage apparatus 1, when, for example, the energy storage apparatus 1 is inserted into the stacked housing 3 including the second wiring arranged on the above-described short side, the second wiring can be easily connected to the external wiring connection component 510.

Moreover, the energy storage apparatus 1 has a configuration in which a blocking component (the blocking component 516, the blocking component 533, the external wiring connection component 510 with the openings 512a through h512c thereof blocked, or the external wiring connection component 530 with the opening 531a blocked) is provided to block, among the plurality of openings 311, an opening 311 not requiring a connector to be attached thereto. This makes it possible to keep foreign matter from entering the energy storage apparatus 1 through the opening 311. In particular, when the energy storage apparatus 1 is cooled by drawing air therein using a fan such as the cooling apparatus 40, there is concern that foreign matter could be drawn in with the air, but it is possible to keep foreign matter from entering with the provision of the blocking component.

Moreover, since the energy storage apparatus 1 includes the module units 11, 12, and 13 and the external wiring connection component 510 is attached to the attachment portion 310 of the outermost module unit 11, the second wiring can be easily attached to the energy storage apparatus 1. Additionally, it is possible to easily configure the energy storage apparatus 1 by lining up the module units 11, 12, and 13 having simple structures.

Moreover, since the energy storage apparatus 1 includes the wiring duct 520 which forms a path for wiring passing between two of the module units, wiring between two module units can be performed easily.

Moreover, since each of the module units 11, 12, and 13 includes two attachment portions 310 to which the external wiring connection component 510 and the wiring duct 520 are detachably attachable, the external wiring connection component 510 and the wiring duct 520 can be switched out as necessary.

Moreover, in the energy storage apparatus 1, since the substrate 600 is disposed in the module unit 11 including the external wiring connection component 510, it is possible to shorten the cable connecting the connectors 513 through 515 and the substrate 600 by disposing the substrate 600 close to the connectors 513 through 515.

Moreover, since the substrate 600 is disposed in the module unit 11 which is located upstream with respect to the flow of the coolant introduced by the cooling apparatus 40, it is possible to limit an increase in temperature of the substrate 600 from the heat generated by the energy storage devices 200 since the introduced coolant comes into contact with the substrate 600.

Hereinbefore, the energy storage apparatus has been described based on the exemplary embodiment according to the present invention, but the scope of the present invention is not limited thereto. In other words, the embodiment disclosed is merely an example in all aspects, and should not be interpreted as limiting. Equivalents of the Claims and various modifications are intended to be included in the exemplary embodiment which do not depart from the principles and spirit of the inventive concept, the scope of which is defined in the appended Claims and not the above-described exemplary embodiment.

For example, in the above embodiment, the external wiring connection component 510 includes the connector holder 512 which is detachably attached to the main body 511, but the connector holder 512 may be fixed to the main body 511.

In the above embodiment, the external wiring connection component 510 is located on a side of the energy storage apparatus 1, which is an end of the energy storage apparatus 1 in a direction in which the positive terminal 230 and the negative terminal 240 are aligned. However, the external wiring connection component 510 may be located on a side other than this side.

In the above embodiment, the external wiring connection component 510 is located on a short side of the energy storage apparatus 1. However, the external wiring connection component 510 may be located on a side other than the short surface side.

In the above embodiment, the external wiring connection component 510 is provided on an outermost one of the plurality of module units. However, the external wiring connection component 510 may be provided on an inner one of the plurality of module units.

In the above embodiment, the restricting components 300 of the module units 11, 12, and 13 include attachment portions 310 to which the external wiring connection components 510 and 530 and the wiring duct 520 are detachably attachable, but this configuration is not limiting. For example, the restricting component 300 of module unit 11 may include an attachment portion to which only the external wiring connection component 510 is detachably attachable and an attachment portion to which only the wiring duct 520 is detachably attachable.

In the above embodiment, substrate 600 is disposed in, among the plurality of module units, a module unit provided with the external wiring connection component 510. However, the substrate 600 may be disposed in a module unit that is not provided with the external wiring connection component 510.

In the above embodiment, substrate 600 is disposed in, among the plurality of module units, a module unit located upstream with respect to the flow of the coolant. However, the substrate 600 may be disposed in a module unit located downstream with respect to the flow of the coolant.

In the above embodiment, the energy storage apparatus 1 includes the cooling apparatus 40, but the energy storage apparatus 1 may have a configuration which does not include the cooling apparatus 40.

The invention claimed is:

1. An energy storage apparatus, comprising:
one or more energy storage devices;
a component on which bus bars are arranged, the component comprising an insulating material;
a wiring connection component for connecting a first wiring and a second wiring, the first wiring being connected to at least one of the one or more energy storage devices; and
an attachment portion to which the wiring connection component is detachably attached,
wherein the energy storage apparatus is disposed in an energy storage pack in which an other energy storage apparatus is disposed,
wherein the wiring connection component connects the first wiring, which is connected to the wiring connection component, and the second wiring, which is connected to the wiring connection component and to the other energy storage apparatus, and
wherein the wiring connection component includes:
a connector to which the first wiring is connected;
a connector holder for holding the connector; and
a main body to which the connector holder is detachably attached.

2. The energy storage apparatus according to claim 1, wherein the main body includes a curved guide portion that guides the first wiring.

3. The energy storage apparatus according to claim 1, wherein each of the one or more energy storage devices includes a positive terminal and a negative terminal, and
wherein the wiring connection component is located on a side of the energy storage apparatus, the side being an end of the energy storage apparatus in a direction in which the positive terminal and the negative terminal are aligned.

4. The energy storage apparatus according to claim 1, wherein the wiring connection component is located on a short side of the energy storage apparatus.

5. The energy storage apparatus according to claim 1, further comprising:
a plurality of openings for attaching the wiring connection component; and
a blocking component that blocks, among the plurality of openings, an opening at which the wiring connection component is not attached.

6. The energy storage apparatus according to claim 1, further comprising a substrate disposed in, among a plurality of module units, each including the one or more energy storage devices, a module unit to which an external wiring connection component is attached.

7. The energy storage apparatus according to claim 6, further comprising a cooling apparatus that introduces a coolant into the plurality of module units,
wherein the substrate is disposed in, among the plurality of module units, a module unit located upstream of a flow of the coolant.

8. The energy storage apparatus according to claim 1, wherein each of the one or more energy storage devices includes a positive terminal and a negative terminal, and
wherein the first wiring connects the energy storage devices in a direction in which the positive terminal and the negative terminal are aligned.

9. The energy storage apparatus according to claim 8, wherein the second wiring connects the energy storage apparatus to the other energy storage apparatus in a perpendicular direction to the direction in which the positive terminal and the negative terminal are aligned.

10. The energy storage apparatus according to claim 8, wherein the second wiring connects the energy storage apparatus to the other energy storage apparatus in a direction different from the direction in which the positive terminal and the negative terminal are aligned.

11. The energy storage apparatus according to claim 1, wherein the first wiring connects module units, each including the one or more energy storage devices, in a direction of an arrangement of the module units in the energy storage apparatus.

12. The energy storage apparatus according to claim 11, wherein the second wiring connects the energy storage apparatus to the other energy storage apparatus in a perpendicular direction to the direction of the arrangement of the module units in the energy storage apparatus.

13. The energy storage apparatus according to claim 11, wherein the second wiring connects the energy storage apparatus to the other energy storage apparatus in a direction different from the direction of the arrangement of the module units in the energy storage apparatus.

14. The energy storage apparatus according to claim 13, wherein an outermost one of the module units is placed outermost in the direction of the arrangement of the module units in the energy storage apparatus.

15. An energy storage apparatus, comprising:
one or more energy storage devices;
a wiring connection component for connecting a first wiring and a second wiring, the first wiring being connected to at least one of the one or more energy storage devices, the second wiring including an external wiring located outside of a case that holds the one or more energy storage devices; and
an attachment portion to which the wiring connection component is detachably attached,
wherein the energy storage apparatus includes first and second module units each including the one or more energy storage devices,
wherein the wiring connection component connects the first wiring, which is connected to the wiring connection component and to the first module unit, and the second wiring, which is connected to the wiring connection component and to the second module unit, and
wherein the wiring connection component includes a wiring duct bridging the first and second module units so as to form a path for wiring passing between the first and second module units.

16. The energy storage apparatus according to claim 15, wherein each of the first and second module units includes two attachment portions to each of which the wiring duct is detachably attachable, and wherein the wiring duct is detachably attached to and bridges two adjacent ones of the attachment portions included in the first and second module units.

* * * * *